US012015550B1

(12) United States Patent
Mishra (10) Patent No.: US 12,015,550 B1
(45) Date of Patent: Jun. 18, 2024

(54) TREE BASED IN-PLACE MECHANISM FOR PATHFINDING OPERATIONS

(71) Applicant: Adobe Inc., San Jose, CA (US)

(72) Inventor: Abhishek Mishra, Maharajganj (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/130,562

(22) Filed: Apr. 4, 2023

(51) Int. Cl.
*H04L 45/488* (2022.01)
*G06T 11/20* (2006.01)
*H04L 45/484* (2022.01)

(52) U.S. Cl.
CPC .......... *H04L 45/488* (2022.05); *G06T 11/206* (2013.01); *H04L 45/484* (2022.05)

(58) Field of Classification Search
CPC ............................ H04L 45/488; G06T 11/206
USPC ......................................................... 709/238
See application file for complete search history.

(56) References Cited

U.S. PATENT DOCUMENTS

| 2013/0124573 | A1* | 5/2013 | Seth ..................... G06F 16/2291 707/E17.011 |
| 2018/0018828 | A1* | 1/2018 | LaMontagne ........... G06T 17/20 |

* cited by examiner

*Primary Examiner* — Sibte H Bukhari
(74) *Attorney, Agent, or Firm* — FIG. 1 Patents (57) ABSTRACT

Techniques are described for tree based in-place mechanism for pathfinding operations. In implementations, indications of a set of visual objects and pathfinding operations to be applied to the visual objects is received. Accordingly, a tree object (e.g., a tree structure) is generated and populated with nodes that represent individual visual objects and/or groups of visual objects. The tree object is traversed and pathfinding operations are applied to subsets of the visual objects based on their respective arrangement in the tree structure. For instance, the tree object is traversed according to a depth first search traversal where pathfinding operations are applied to subsets of visual object nodes to generate operation results. Further, subsets of the operation results become input to further pathfinding operations with additional visual objects until a final operation result is output. The final operation result is rendered and output, such as for display.

20 Claims, 10 Drawing Sheets

TREE BASED IN-PLACE MECHANISM FOR PATHFINDING OPERATIONS

BACKGROUND won Computing systems provide users with a variety of functionality for editing digital graphics, such as generating digital graphics, manipulating visual attributes of digital graphics, etc. Further, visual objects are combinable in various ways to generate new digital graphics. For instance, visual objects such as visual primitives are combinable in different ways to generate complex visual objects. Some graphics editing systems, however, experience challenges when attempting to apply sets of graphics operations to sets of visual objects. For instance, where a user selects multiple visual objects and multiple graphics operations to be applied to the visual objects to achieve a desired visual output, some graphics editing systems improperly apply the graphics operations such that the systems output an erroneous result and the desired visual output is not achieved. Thus, such graphics editing systems can cause a user to engage in excessive manual interactions to attempt to generate a desired visual output.

SUMMARY

Techniques are described for tree based in-place mechanism for pathfinding operations. In implementations, indications of a set of visual objects and pathfinding operations (e.g., pertaining to graphics operations) to be applied to the visual objects is received. Accordingly, a tree object (e.g., a tree structure) is generated and populated with nodes that represent individual visual objects and/or groups of visual objects. The tree object is traversed and pathfinding operations are applied to subsets of the visual objects based on their respective arrangement in the tree structure. For instance, the tree object is traversed according to a depth first search traversal where pathfinding operations are applied to subsets of visual object nodes to generate operation results. Further, subsets of the operation results become input to further pathfinding operations with additional visual objects until a final operation result is output. The final operation result is rendered and output, such as for display.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

To overcome the challenges to applying graphics operations to sets of visual objects presented in conventional graphics systems, tree based in-place mechanism for pathfinding operations is leveraged in a digital medium environment. For instance, to mitigate the challenges to correctly applying graphics operations to sets of visual objects that have hierarchical relationships, the described techniques generate tree structures that are populated with nodes that indicate a correct hierarchical relationship between visual objects. Further, the tree structures are navigable in a particular order to enable pathfinding operations to be correctly applied to sets of visual objects.

In implementations, indications of a set of visual objects and pathfinding operations (e.g., pertaining to graphics operations) to be applied to the visual objects are received. A user, for instance, specifies a set of visual objects and selects pathfinding operations to be applied to the visual objects. Accordingly, a tree object (e.g., a tree structure) is generated and populated with nodes that represent individual visual objects and/or groups of visual objects. In at least some implementations the tree object is generated as an N-ary tree structure with nodes representing visual objects arranged hierarchically based on an order in which pathfinding operations are to be applied to the visual objects.

Accordingly, the tree object is traversed and pathfinding operations are applied to subsets of the visual objects based on their respective arrangement in the tree structure. For instance, the tree object is traversed according to a depth first search traversal where pathfinding operations are applied to subsets of visual object nodes to generate operation results. Further, subsets of the operation results become input to further pathfinding operations with additional visual objects until a final operation result is output. The final operation result can be rendered and output, such as for display.

Accordingly, the described implementations enable pathfinding operations to be accurately applied to sets of visual objects in a correct order, which enables more accurate graphical editing than is provided by conventional graphics editing systems.

Example Environment

Figure 1:
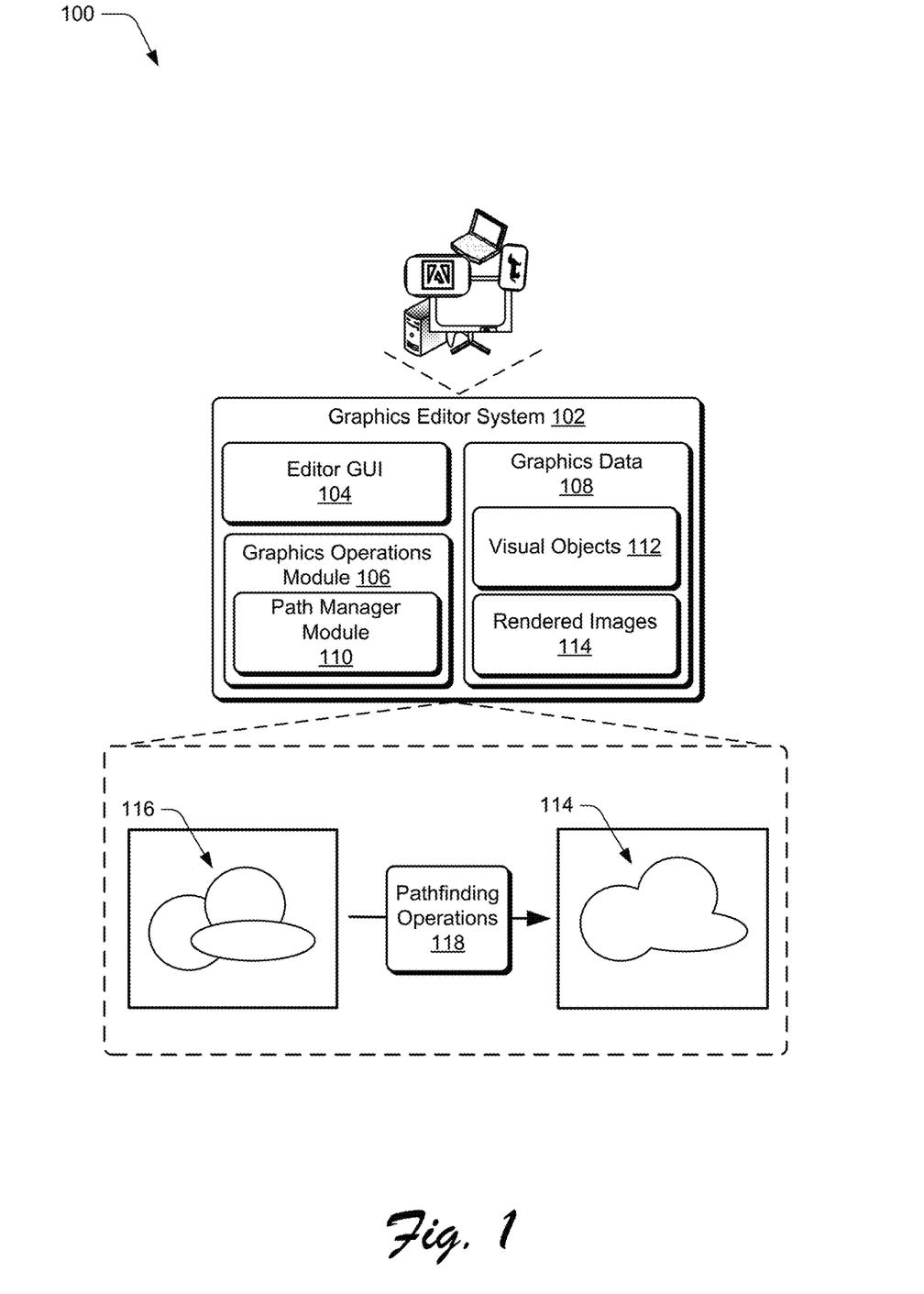
FIG. 1 is an illustration of an environment in an example implementation that is operable to employ tree based in-place mechanism for pathfinding operations as described herein.

FIG. 1 is an illustration of an environment 100 in an example implementation that is operable to employ tree based in-place mechanism for pathfinding operations as described herein. The illustrated environment 100 includes a graphics editor system 102 that is operable to perform various graphics editing operations, such as creating and editing digital images. Examples of computing devices that are used to implement the graphics editor system 102 include a desktop computer, a server device, multiple interconnected computing devices, and so forth. Additionally, the graphics editor system 102 is implementable using a plurality of different devices, such as multiple servers utilized by an enterprise to perform operations "over the cloud" as further described in relation to FIG. 7.

The graphics editor system 102 includes various functionality and data that enables aspects of tree based in-place mechanism for pathfinding operations including an editor graphical user interface (GUI) 104, a graphics operations module 106, and graphics data 108. The editor GUI 104 represents functionality that enables users to interact with the graphics editor system 102, such as to invoke functionality of the graphics editor system 102 and to view output of the graphics editor system 102. The graphics operations module 106 represents functionality to perform techniques for tree based in-place mechanism for pathfinding operations such as detailed herein. For instance, to enable the described techniques, the graphics operations module 106 includes a path manager module 110. Further details concerning operation of the graphics operations module 106 and the path manager module 110 are discussed in detail below.

The graphics data 108 represents different types of data that is stored and/or generated by the graphics editor system 102, including visual objects 112 and rendered images 114. The visual objects 112 represent digital graphics that are editable in various ways, such as using different graphics operations applied using pathfinding operations to the visual objects 112. The rendered images 114 represent instances of the visual objects 112 that are edited via application of different pathfinding operations. As used herein, pathfinding operations represent different graphics editing operations that are applicable to instances of visual objects 112, such as union operations, subtraction operations, addition operations, exclusion operations, etc. A union operation, for instance, represents an operation where multiple visual objects are merged into a single integrated visual object. A subtraction operation represents an operation wherein a difference of one visual object is subtracted from another visual object to generate an output visual object. An addition operation represents an operation where a first visual object is added to a second visual object to generate an output visual object. An exclusion operation represents an operation where overlapping portions of multiple visual objects are removed. These examples of pathfinding operations are presented for purpose of example only and it is to be appreciated that the implementations described herein are applicable to a wide variety of different pathfinding operations.

As an example, consider that a user interacts with the graphics editor system 102 to select a visual object set 116 from the visual objects 112. Further, the user specifies different pathfinding operations to be applied to the visual objects 112 of the visual object set 116. Accordingly, the graphics operations module 106 leverages the path manager module 110 to perform pathfinding operations 118 on the visual object set 116 to generate a rendered image 114. For instance, as part of the pathfinding operations 118, a tree object that represents the visual object set 116 is generated and the tree object is traversed to perform the various pathfinding operations 118 on the visual object set 116 and generate the rendered image 114. Various ways for performing the pathfinding operations 118 to generate the rendered image 114 are detailed throughout this disclosure.

Having considered an example environment and system, consider now a discussion of some example details of the techniques for tree based in-place mechanism for pathfinding operations in a digital medium environment in accordance with one or more implementations.

Figure 2:
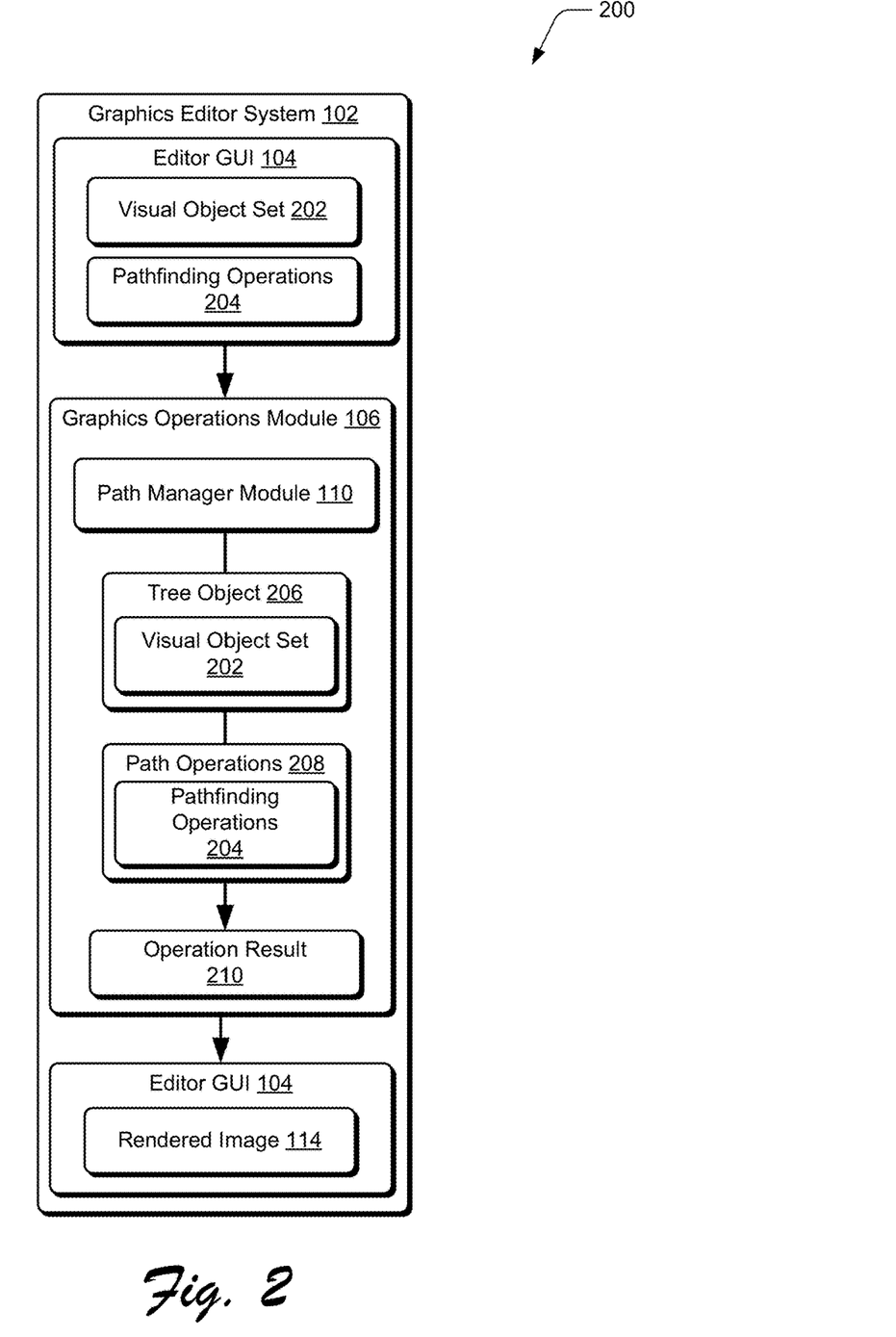
FIG. 2 depicts an example system for tree based in-place mechanism for pathfinding operations in accordance with one or more implementations.

FIG. 2 depicts an example system 200 for tree based in-place mechanism for pathfinding operations in accordance with one or more implementations. The system 200 incorporates features of the environment 100 and is operable within the context of the environment 100. In the system 200 a visual object set 202 and pathfinding operations 204 to be applied to the visual object set 202 are selected. The visual object set 202, for instance, includes instances of the visual objects 112. Examples of the pathfinding operations 204 are introduced above, such as union operations, subtraction operations, addition operations, exclusion operations, etc. In at least one implementation the visual object set 202 and/or the pathfinding operations 204 are selected via user input to the editor GUI 104. Alternatively or additionally the visual object set 202 and/or the pathfinding operations 204 are automatically selected such as by the graphics editor system 102 to perform a particular graphics editing task.

Further to the system 200, the graphics operations module 106 leverages the path manager module 110 to generate a tree object 206 that includes the visual object set 202. The tree object 206, for instance, represents a data tree populated with nodes that represent individual visual objects 112 and/or groups of visual objects 112 from the visual object set 202, such as an N-ary tree. The path manager module 110 then performs path operations 208 based on the pathfinding operations 204. For instance, as part of the path operations 208 the path manager module 110 traverses the tree object 206 and applies different pathfinding operations 204 to nodes of the tree object 206. Accordingly, based on the path operations 208, the graphics operations module 106 generates an operation result 210 and renders the operation result 210 as a rendered image 114. The operation result 210, for instance, represents the various pathfinding operations 204 applied to the visual object set 202 and the rendered image 114 represents visual output of the operation result 210, such as via the editor GUI 104.

Figure 3:
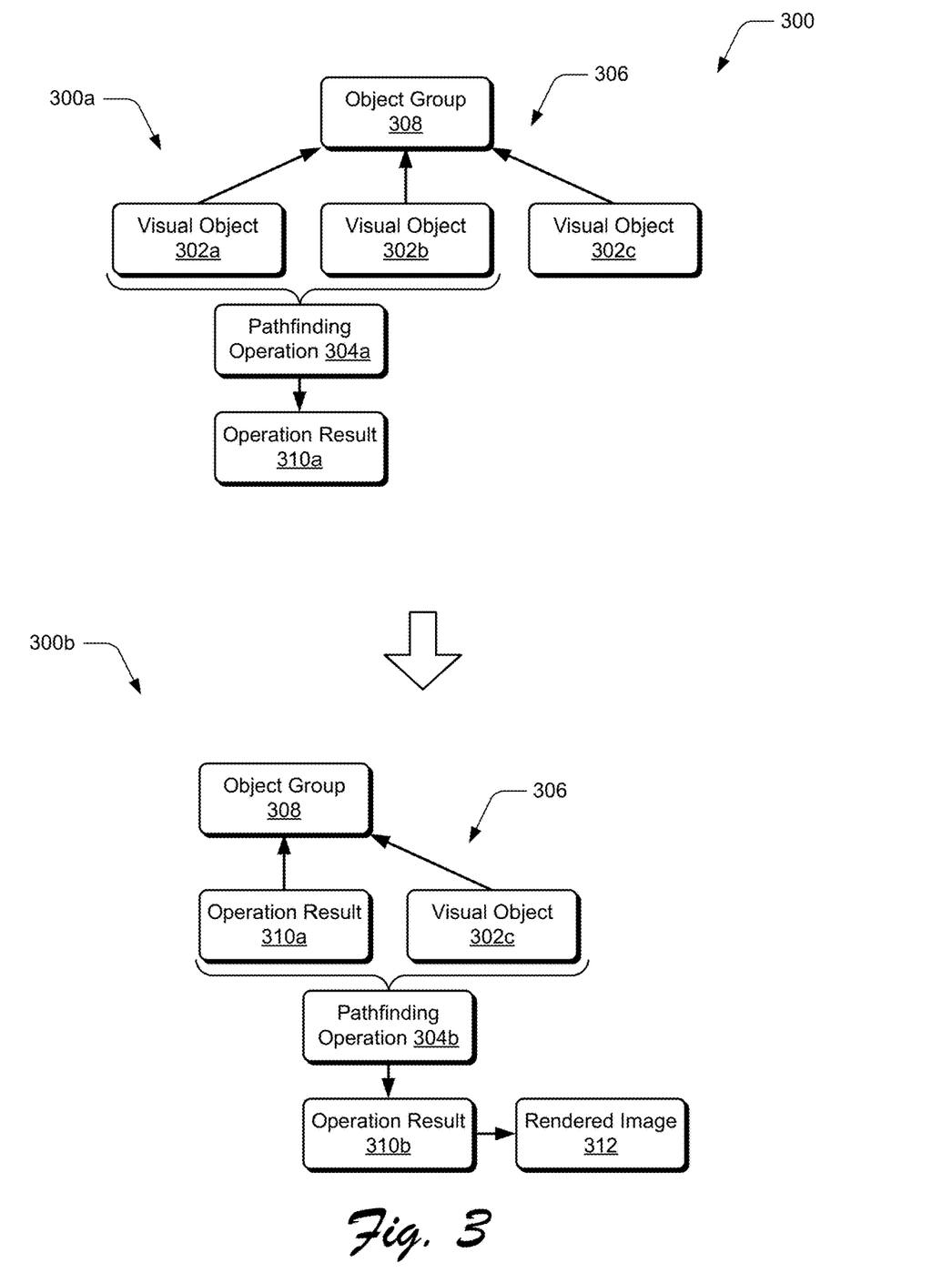
FIG. 3 depicts an example scenario for tree based in-place mechanism for pathfinding operations in accordance with one or more implementations.

FIG. 3 depicts an example scenario 300 for tree based in-place mechanism for pathfinding operations in accordance with aspects of the present disclosure. The scenario 300 is implementable in the context of and utilizing features of the environment 100 and/or the system 200, and/or any other suitable environment/system. Aspects of the scenario 300, for instance, are performed via the graphics operations module 106 and/or the path manager module 110.

The scenario 300 includes visual objects 302 including a visual object 302a, visual object 302b, and a visual object 302c. The visual objects 302, for instance, represent instances of the visual objects 112. Further, pathfinding operations 304 are to be performed using the visual objects 302. A user, for instance, interacts with the graphics editor system 102 to select the visual objects 302 and specify pathfinding operations 304 to be applied to the visual objects 302. Different examples of the pathfinding operations 304 are detailed throughout this disclosure.

Accordingly, a tree object 306 is generated by generating an object group 308 as a root node and the visual objects 302 as child nodes. At 300a a pathfinding operation 304a is performed using the visual objects 302a, 302b to generate an operation result 310a. Continuing, at 300b a pathfinding operation 304b is performed using the operation result 310a and the visual object 302c to generate an operation result 310b. The operation result 310b is rendered as a rendered image 312, e.g., for display by the graphics editor system 102.

According to implementations, the pathfinding operations 304 are reversible to enable the rendered image 312 to be undone to generate the individual visual objects 302 from the rendered image 312. For instance, after the rendered image is generated, a user can select an "undo" control to cause the pathfinding operations 304 to be undone and the individual visual objects 302 to be generated.

FIGS. 4a-4d depict aspects of an example scenario 400 for tree based in-place mechanism for pathfinding operations in accordance with aspects of the present disclosure. The scenario 400 is implementable in the context of and utilizing features of the environment 100 and/or the system 200, and/or any other suitable environment/system. Aspects of the scenario 400, for instance, are performed via the graphics operations module 106 and/or the path manager module 110.

Figure 4A:
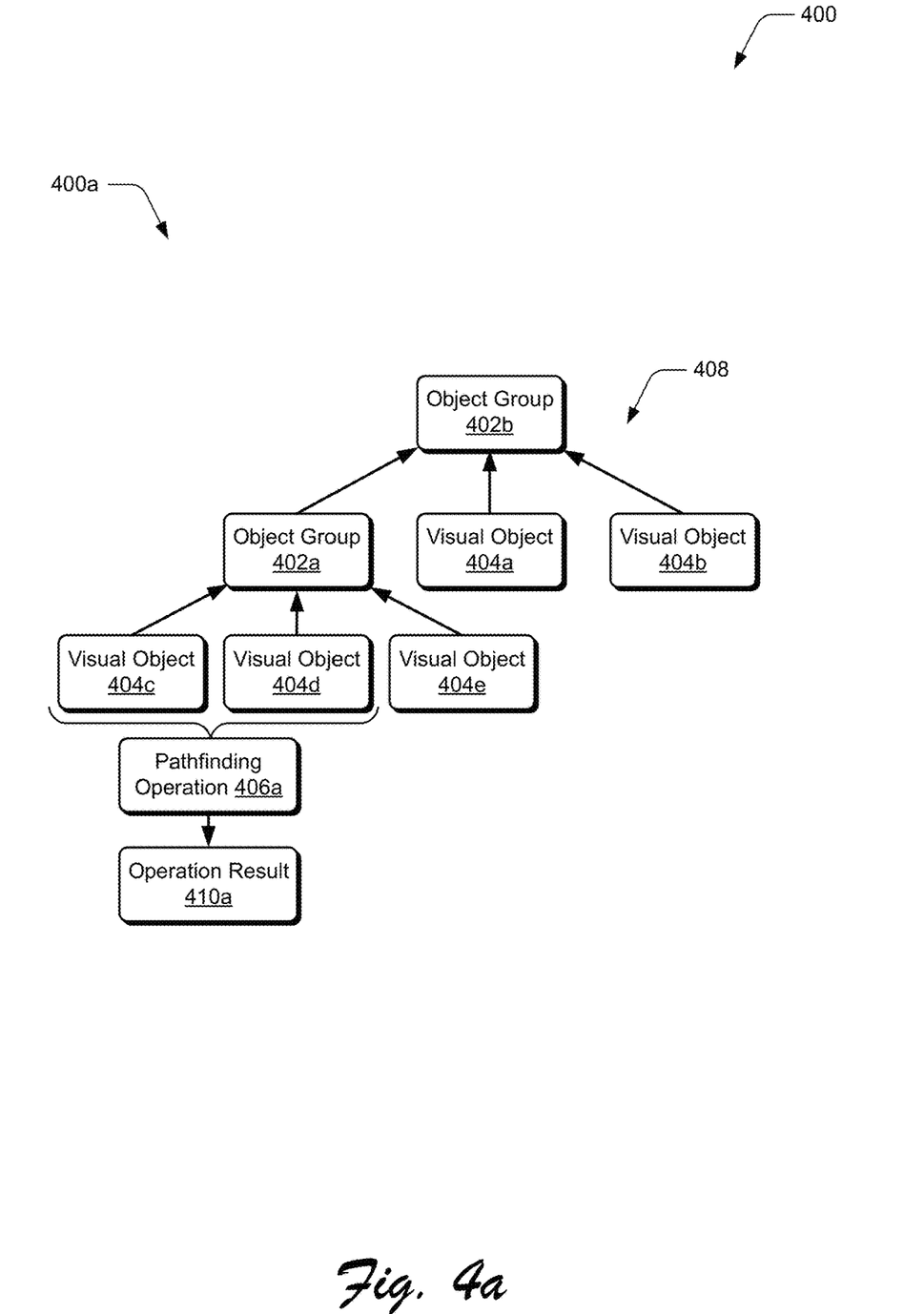
FIGS. 4a-4d depict different aspects of an example scenario for tree based in-place mechanism for pathfinding operations in accordance with one or more implementations.

The scenario 400 includes an object group 402a, a visual object 404a, and a visual object 404b. Further, the object group 402a includes a visual object 404c, a visual object 404d, and a visual object 404e. In implementations the visual objects 404 represent instances of the visual objects 112. A set of pathfinding operations 406 are specified to be performed on the different visual objects 404. A user, for instance, interacts with the graphics editor system 102 to select the visual objects 404 and specify pathfinding operations 406 to be applied to the visual objects 404. Different examples of the pathfinding operations 406 are detailed throughout this disclosure.

Accordingly, at 400a a tree object 408 is generated that includes an object group 402b as a root node and the object group 402a and the visual objects 404a, 404b as child nodes. Further, the visual objects 404c-404e are child nodes of the object group 402a. To traverse the tree object 408 and process the different visual objects 404, a pathfinding operation 406a is applied using the visual objects 404c, 404d to generate an operation result 410a.

Figure 4B:
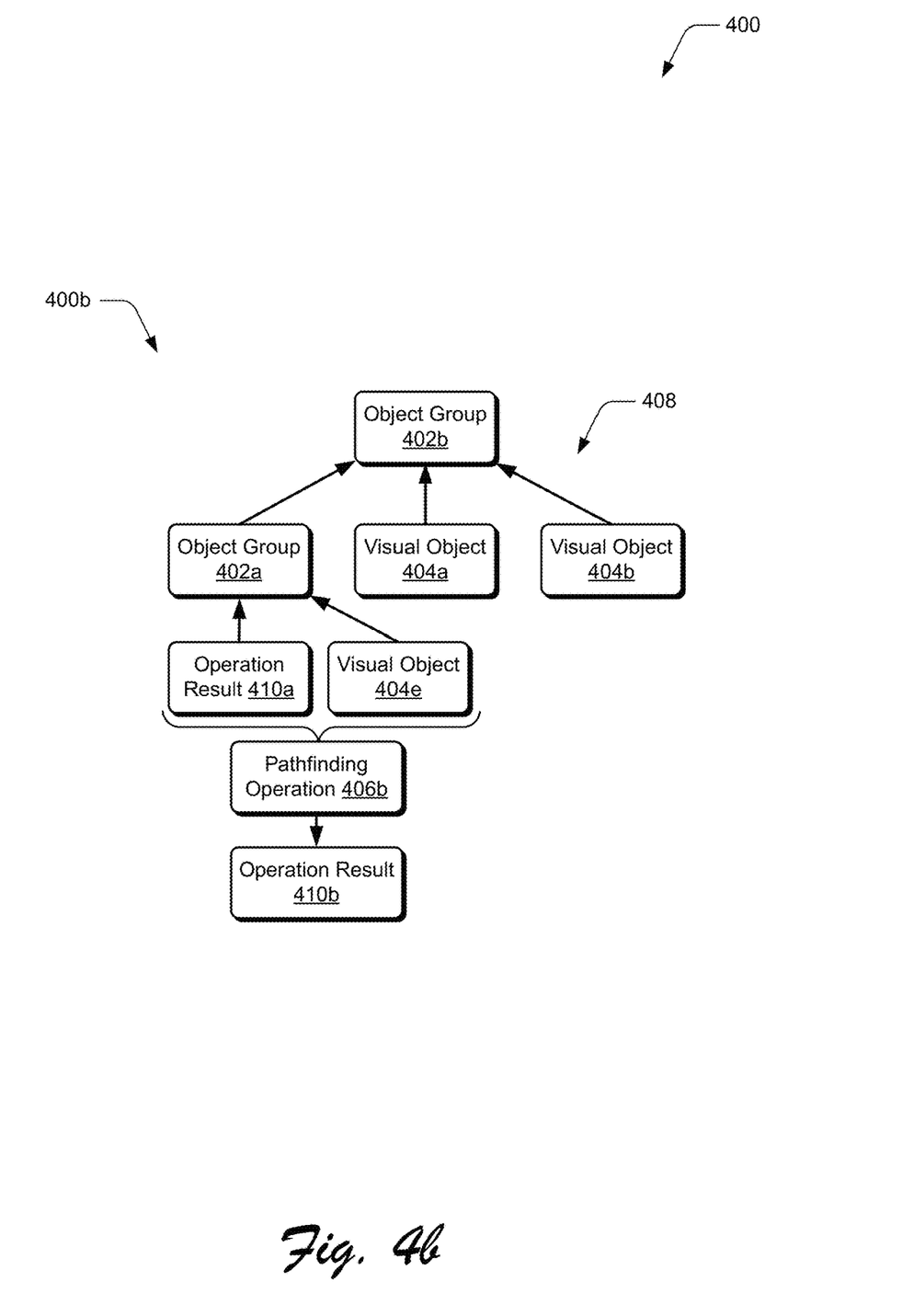
Figure 4C:
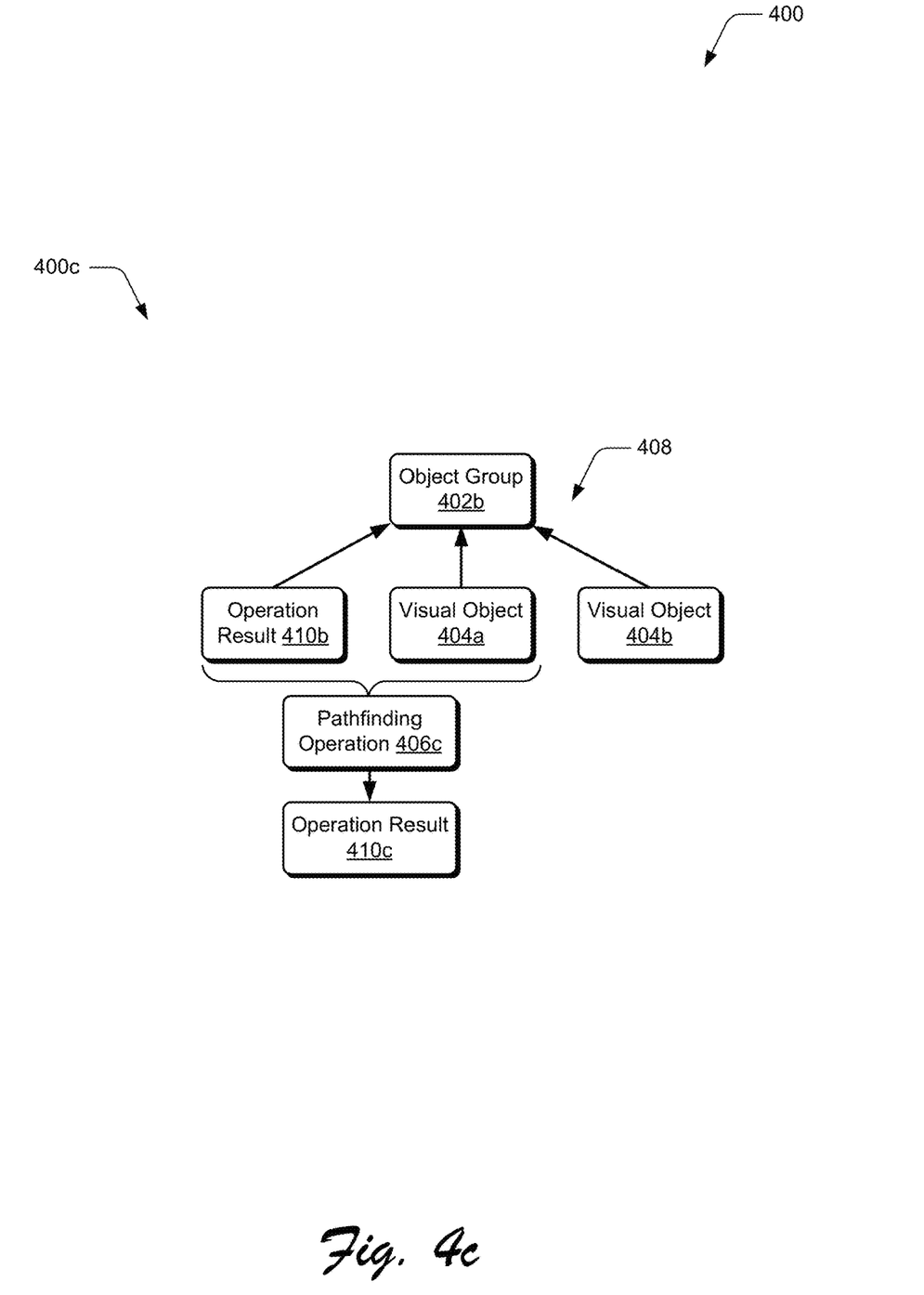

Continuing with the scenario 400 in FIG. 4b and at 400b, a pathfinding operation 406b is applied using the operation result 410a and the visual object 404e to generate an operation result 410b, and in FIG. 4c at 400c a pathfinding operation 406c is applied using the operation result 410b and the visual object 404a to generate an operation result 410c. Further, at FIG. 4d and at 400d a pathfinding operation 406d is applied using the operation result 410c and the visual object 404b to generate an operation result 410d. The operation result 410d is rendered as a rendered image 412, such as for display by the graphics editor system 102.

Figure 4D:
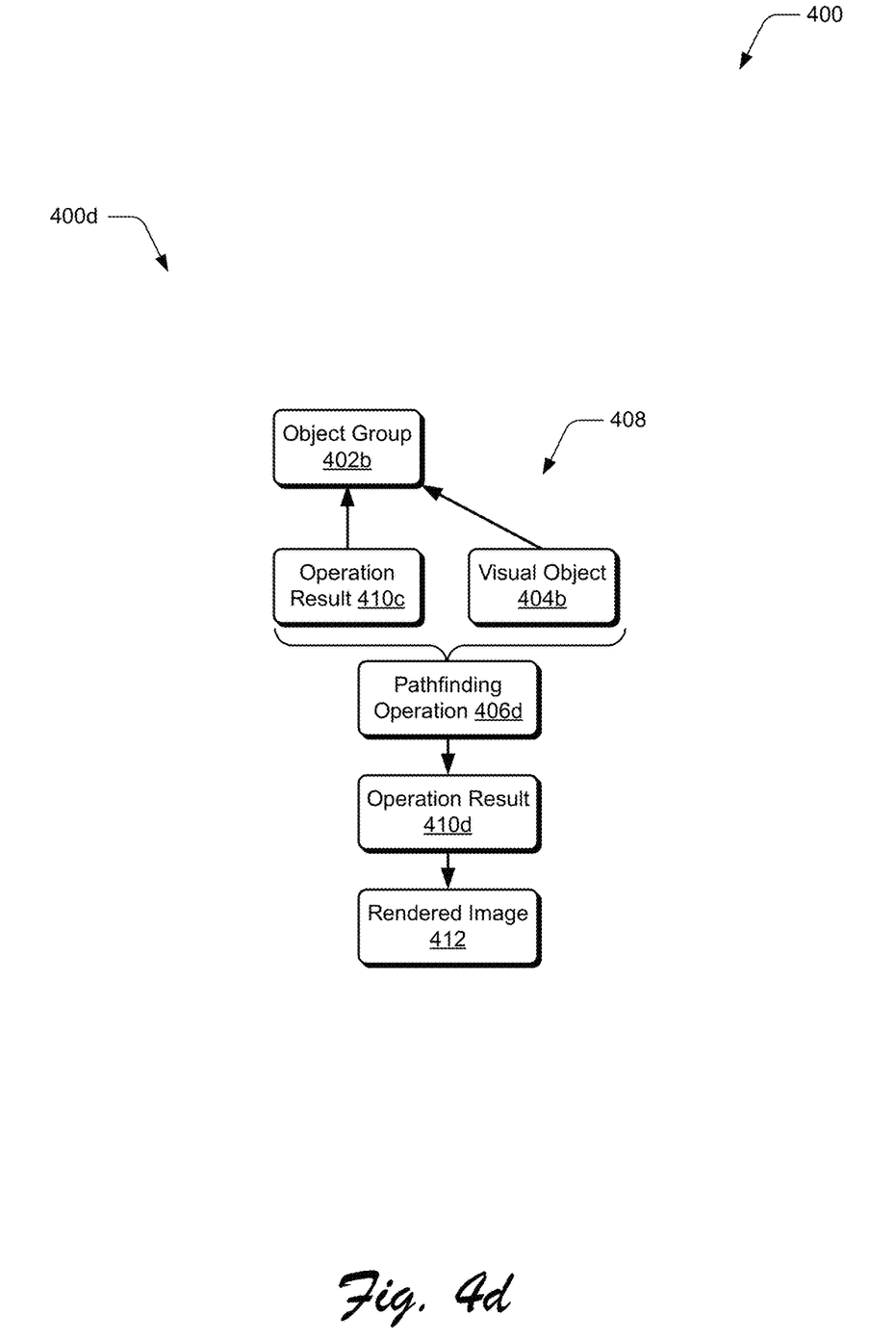

According to implementations, the pathfinding operations 406 are reversible to enable the rendered image 412 to be undone to generate the individual visual objects 404 from the rendered image 412. For instance, after the rendered image 412 is generated, a user can select an "undo" control to cause the pathfinding operations 406 to be undone and the individual visual objects 404 and the object group 402a to be generated as depicted in the tree object 408 at 400a.

According to implementations, the tree objects 306, 408 represent different N-ary trees and the various operations performed in the scenarios 300, 400 are performed using depth first search traversals on the different paths of the respective tree objects 306, 408. For instance, the lowest most paths of the tree objects 306, 408 are initially traversed and pathfinding operations applied to visual objects in pairs, e.g., two at a time.

For example, with reference to the scenario 400, traversal of the tree object 408 starts with applying the pathfinding operations 406a, 406b to the visual objects 404c-404e that are child nodes of the object group 402a to generate the respective operation results 410a, 410b. Further, in implementations traversal of the paths of the tree objects 306, 408 is done "in-place" and thus does not create and/or use additional memory for paths and/or groups already present or for storing intermediate results. Further, the object groups 308, 402b generated in the scenarios 300, 400 represent placeholders for purposes of generating the respective tree objects 306, 408 and thus additional memory is not allocated or required to generate and manage the placeholder object groups 308, 402b.

The described techniques also enable ordering of different pathfinding operations. For instance, consider a scenario where a tree object includes a parent object group and a child object group of the parent object group. Further, an intersect pathfinding operation is to be performed for the child object group and a union pathfinding operation is to be performed for the parent object group. In such scenarios and using traversal of the tree object (e.g., depth first search traversal), the intersect pathfinding operation is performed on two or more visual objects of the child object group and a resultant operation result from the intersect pathfinding operation is used to perform the union pathfinding operation with a sibling node of the tree object or a different child node (e.g., visual object and/or other operation result) of the parent object group.

According to implementations, a set of color parameters are specified for generating the different operation results such as described in the scenarios 300, 400. For instance, for pathfinding operations including union, exclude, and intersect operations, a color that is applied to an operation result corresponds to a color (e.g., fill color) of an object with a highest z-order of the visual objects included in the pathfinding operations. As another example, for a subtraction pathfinding operation, a color that is applied to an operation result corresponds to a color (e.g., fill color) of an object with a lowest z-order of the visual objects included in the pathfinding operation.

Consider, for example, an N-ary tree that is constructed such as described in the scenarios 300, 400. To apply a correct color to an operations result, a visual object with a highest z-order and/or lowest z-order is determined, a color of the visual object is determined, and the color is propagated to a root of the N-ary tree as part of recursively traversing the N-ary tree and according to the color parameters described above. Thus, additional calculations outside of tree traversal (e.g., depth first search traversal) to determine an appropriate color for an operations result are avoidable.

Having discussed some implementation details, consider now some example methods for tree based in-place mechanism for pathfinding operations. In implementations the methods are performed by the graphics editor system 102, such as described above.

Figure 5:
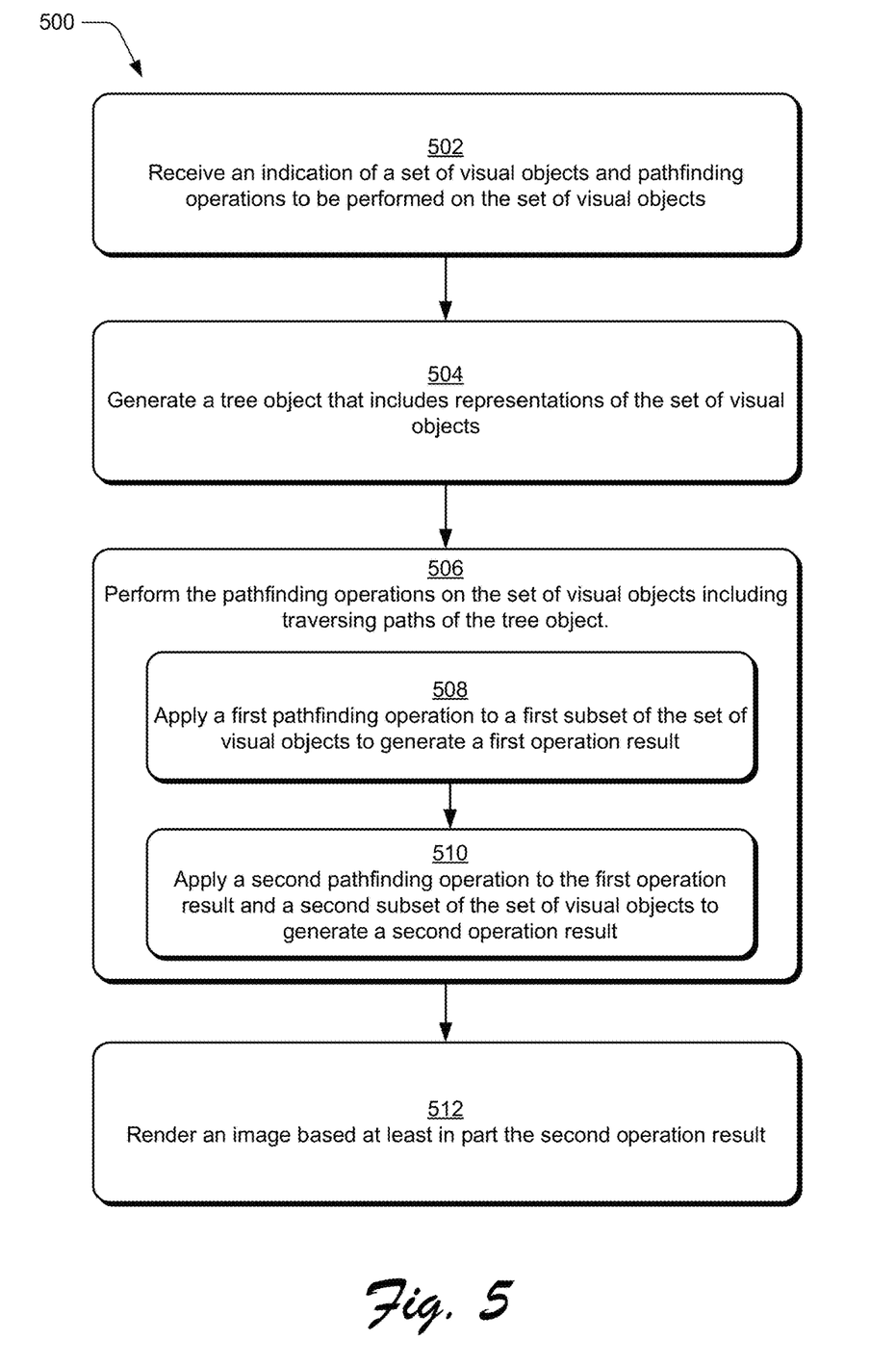
FIG. 5 depicts a flow chart describing an example method for tree based in-place mechanism for pathfinding operations.

FIG. 5 depicts a flow chart describing an example method 500 for tree based in-place mechanism for pathfinding operations. Step 502 receives an indication of a set of visual objects and pathfinding operations to be performed on the set of visual objects. A user, for instance, interacts with the graphics editor system 102 to select the set of visual objects and pathfinding operations to be performed on the set of visual objects. As used herein the term "visual object" includes a digital visual object such as stored on a memory.

Step 504 generates a tree object that includes representations of the set of visual objects. In at least one implementation the tree object is generated as an N-ary tree populated with nodes that represent the set of visual objects. For instance, a first object group (e.g., a placeholder object group) is generated as a root node and the set of visual objects represent child nodes of the first object group. In at least one implementation the tree object includes a second object group that is a child node of the first object group, and at least some visual objects of the set of visual objects represent child nodes of the second object group.

Step 506 performs the pathfinding operations on the set of visual objects including traversing paths of the tree object. For instance, in implementations where the tree object represents an N-ary tree, the N-ary tree is traversed using depth first search traversals on the different paths of the N-ary tree to apply the different pathfinding operations to the different node representations of the set of visual objects.

As part of performing the pathfinding operations, step 508 applies a first pathfinding operation to a first subset of the set of visual objects to generate a first operation result. The first operation result, for instance, represents a first visual object that results from application of the first pathfinding operation to the first subset of the set of visual objects. Step 510 applies a second pathfinding operation to the first operation result and a second subset of the set of visual objects to generate a second operation result. The second pathfinding operation, for instance, is applied to a first operation result generated at step 508 and to the second subset of the set of visual objects to generate a second operation result.

Step 512 renders an image based at least in part the second operation result. The graphics editor system 102, for instance, renders the second operation result (e.g., the second visual object) to generate an output image. The image, for example, is output via the editor GUI 104. While the method 500 is discussed with reference to two pathfinding operations and two subsets of visual objects, it is to be appreciated that techniques described herein are applicable to large sets of visual objects and utilizing numerous pathfinding operations, such as to generate complex visual objects.

Figure 6:
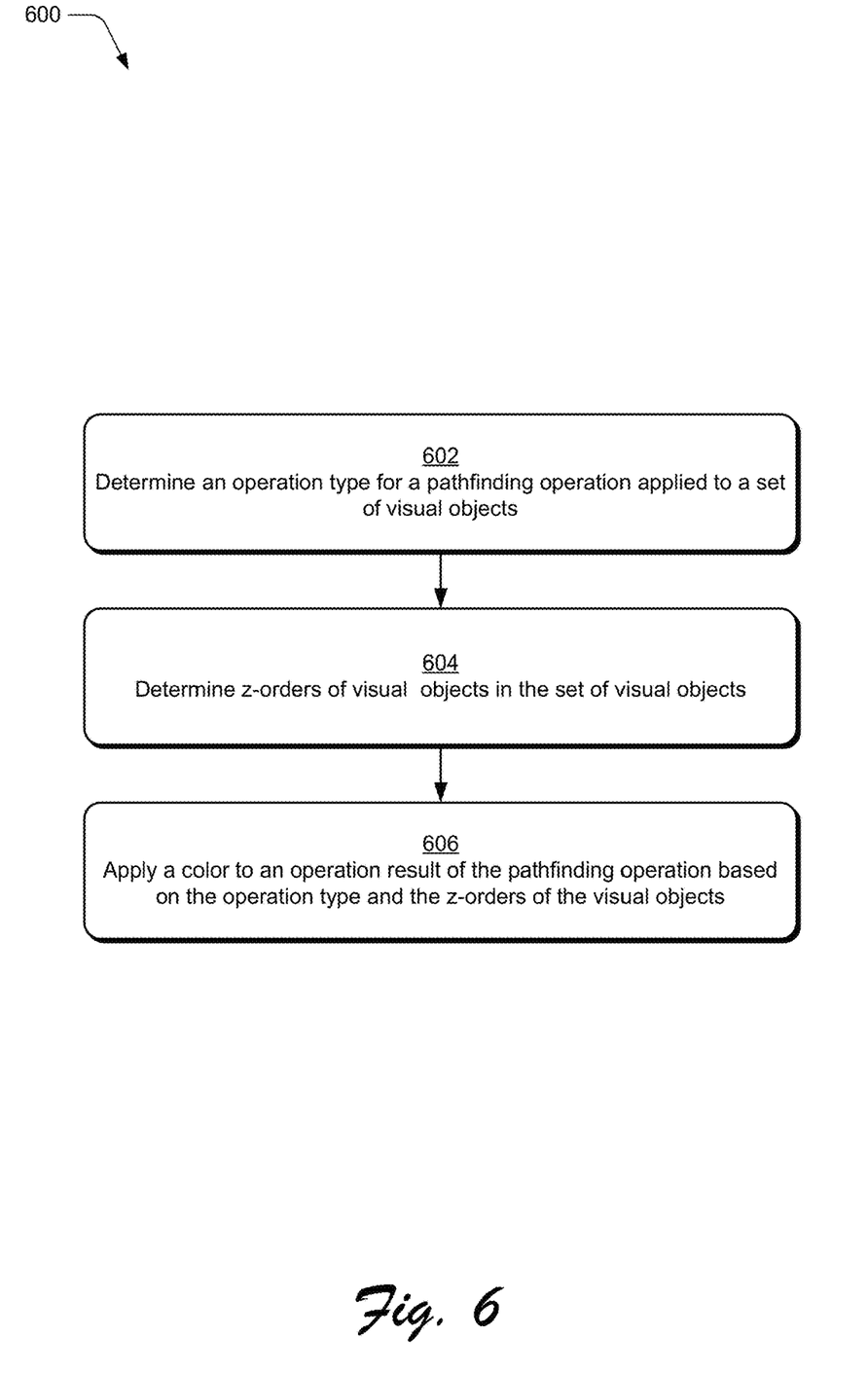
FIG. 6 depicts a flow chart describing an example method for applying color to visual objects.

FIG. 6 depicts a flow chart describing an example method 600 for applying color to visual objects. The method 600, for instance, is implementable in conjunction with the method 500 to apply color to different operation results, visual objects, and/or rendered images. Step 602 determines an operation type for a pathfinding operation applied to a set of visual objects. Examples of different types of pathfinding operations are detailed above. Step 604 determines z-orders of visual objects in the set of visual objects. For instance, a visual object with a highest z-order in the set of visual objects is identified, and/or a visual object with a lowest z-order in the set of visual objects is identified.

Step 606 applies a color to an operation result of the pathfinding operation based on the operation type and the z-orders of the visual objects. For instance, where the pathfinding operation comprises one or more of a union operation, an exclude operation, or an intersect operation, a color of a visual object with a highest z-order is applied to the operation result. As another example, where the pathfinding operation comprises a subtraction operation, a color of a visual object with a lowest z-order is applied to the operation result.

The example methods described above are performable in various ways, such as for implementing different aspects of the systems and scenarios described herein. For instance, aspects of the methods are implemented by the graphics editor system 102 and/or the graphics operations module 106. Generally, any services, components, modules, methods, and/or operations described herein are able to be implemented using software, firmware, hardware (e.g., fixed logic circuitry), manual processing, or any combination thereof. Some operations of the described methods, for example, are described in the general context of executable instructions stored on computer-readable storage memory that is local and/or remote to a computer processing system, and implementations include software applications, programs, functions, and the like. Alternatively or in addition, any of the functionality described herein is performable, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations are able to be performed in any order to perform a method, or an alternate method.

Having described example procedures in accordance with one or more implementations, consider now an example system and device that are able to be utilized to implement the various techniques described herein.

Example System and Device

Figure 7:
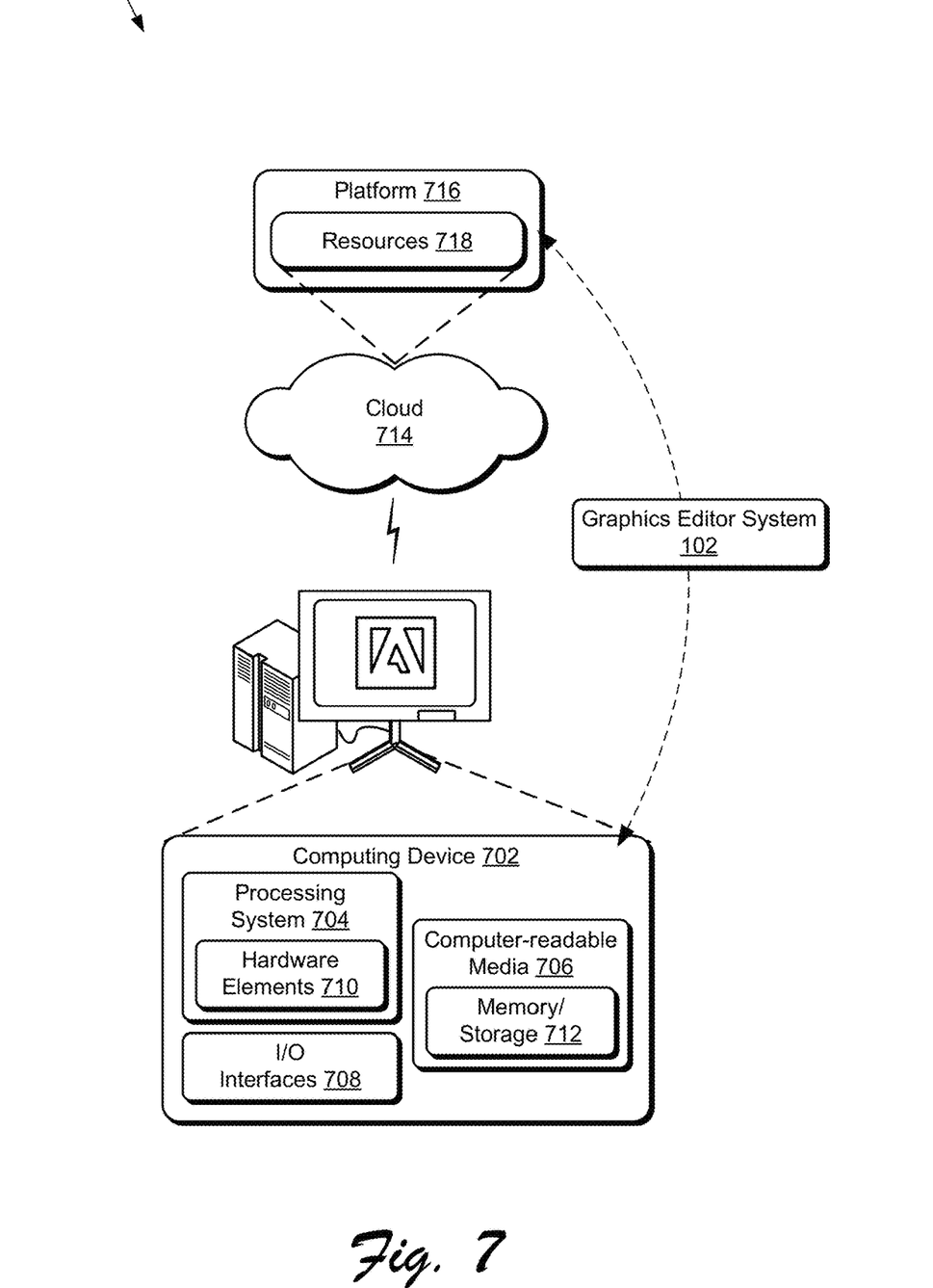
FIG. 7 illustrates an example system that includes an example computing device that is representative of one or more computing systems and/or devices that are usable to implement the various techniques described herein.

FIG. 7 illustrates an example system 700 that includes an example computing device 702 that is representative of one or more computing systems and/or devices that are usable to implement the various techniques described herein. This is illustrated through inclusion of the graphics editor system 102. The computing device 702 includes, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that are be configured as processors, functional blocks, and so forth. This includes example implementations in hardware as an application specific integrated circuit or other logic device formed using one or more semiconductors. The hardware elements 710 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 706 is illustrated as including memory/storage 712. The memory/storage 712 represents memory/storage capacity associated with one or more computer-readable media. In one example, the memory/storage 712 includes volatile media (such as random access memory (RAM)) and/or nonvolatile media (such as read only memory (ROM), Flash memory, optical disks, magnetic disks, and so forth). In another example, the memory/storage 712 includes fixed media (e.g., RAM, ROM, a fixed hard drive, and so on) as well as removable media (e.g., Flash memory, a removable hard drive, an optical disc, and so forth). The computer-readable media 706 is configurable in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that that is accessible to the computing device 702. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 702, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 710. For example, the computing device 702 is configured to implement particular instructions and/or functions corresponding to the software and/or hardware modules. Accordingly, implementation of a module that is executable by the computing device 702 as software is achieved at least partially in hardware, e.g., through use of computer-readable storage media and/or hardware elements 710 of the processing system 704. The instructions and/or functions are executable/operable by one or more articles of manufacture (for example, one or more computing devices 702 and/or processing systems 704) to implement techniques, modules, and examples described herein.

The techniques described herein are supportable by various configurations of the computing device 702 and are not limited to the specific examples of the techniques described herein. This functionality is also implementable entirely or partially through use of a distributed system, such as over a "cloud" 714 as described below.

The cloud 714 includes and/or is representative of a platform 716 for resources 718. The platform 716 abstracts underlying functionality of hardware (e.g., servers) and software resources of the cloud 714. For example, the resources 718 include applications and/or data that are utilized while computer processing is executed on servers that are remote from the computing device 702. In some examples, the resources 718 also include services provided over the Internet and/or through a subscriber network, such as a cellular or Wi-Fi network.

The platform 716 abstracts the resources 718 and functions to connect the computing device 702 with other computing devices. In some examples, the platform 716 also serves to abstract scaling of resources to provide a corresponding level of scale to encountered demand for the resources that are implemented via the platform. Accordingly, in an interconnected device embodiment, implementation of functionality described herein is distributable throughout the system 700. For example, the functionality is implementable in part on the computing device 702 as well as via the platform 716 that abstracts the functionality of the cloud 714.

What is claimed is:

1. A system comprising:
a memory component storing executable instructions; and
a processing device coupled to the memory component and operable to execute the executable instructions to:
receive an indication of a set of visual objects and pathfinding operations to be performed on the set of visual objects;
generate a tree object that includes representations of the set of visual objects, including to generate a placeholder object group as a root node of the tree object and a representation of a visual object group as a child node of the placeholder object group, a first subset of the set of visual objects comprising child nodes of the visual object group and a second subset of the set of visual objects comprise one or more child nodes of the placeholder object group;
perform the pathfinding operations on the set of visual objects including traversing paths of the tree object to:
apply a first pathfinding operation to a first subset of the set of visual objects to generate a first operation result; and
apply a second pathfinding operation to the first operation result and a second subset of the set of visual objects to generate a second operation result; and
render an image based at least in part the second operation result.

2. The system of claim 1, wherein to generate the tree object, the executable instructions are executable by the processing device to:
indicate the representations of the set of visual objects as child nodes of the placeholder object group.

3. The system of claim 1, wherein the first subset of the set of visual objects comprises an object group of multiple visual objects, and wherein to apply the first pathfinding operation to the first subset of the set of visual objects comprises to apply multiple pathfinding operations to the multiple visual objects of the object group to generate the first operation result.

4. The system of claim 1, wherein to generate the tree object, the executable instructions are executable by the processing device to:
generate a first object group as a root node of the tree object; and
generate a second object group as a child node of the root node, wherein the first subset of visual objects and the second subset of visual objects comprise child nodes of the second object group.

5. The system of claim 4, wherein to perform the pathfinding operations on the set of visual objects, the executable instructions are executable by the processing device to:
apply a third pathfinding operation to the second operation result and a child visual object of the root node to generate a third operation result; and
render the image based at least in part on the third operation result.

6. The system of claim 1, wherein to generate the tree object, the executable instructions are executable by the processing device to:
generate a first object group as a root node of the tree object; and
generate a second object group as a child node of the root node, wherein the second subset of visual objects comprise child nodes of the first object group and the first subset of visual objects comprise child nodes of the second object group.

7. The system of claim 6, wherein the first pathfinding operation comprises an intersect operation and the second pathfinding operation comprises a union operation, and wherein to perform the pathfinding operations on the set of visual objects, the executable instructions are executable by the processing device to first apply the intersect operation to the first subset of visual objects to generate the first operation result, and then apply the union operation on the first operation result to generate the second operation result.

8. The system of claim 1, wherein the executable instructions are executable by the processing device to generate the tree object as an N-ary tree populated with the representations of the set of visual objects, and to traverse paths of the N-ary tree according to depth first search traversal to generate the first operation result and the second operation result.

9. The system of claim 1, wherein the second pathfinding operation comprises one or more of a union operation, an exclude operation, or an intersect operation, and wherein the executable instructions are executable by the processing device to:
determine a visual object that has a highest z-order in the second operation result; and
apply a color of the visual object to the second operation result.

10. The system of claim 1, wherein the second pathfinding operation comprises a subtraction operation, and wherein the executable instructions are executable by the processing device to:
determine a visual object that has a lowest z-order in the second operation result; and
apply a color of the visual object to the second operation result.

11. A method comprising:
receiving an indication of a set of visual objects and a set of pathfinding operations to be performed on the set of visual objects, the set of visual objects including a first subset of visual objects in a first visual object group, and a second subset of one or more visual objects;
generating a tree object that includes a representation of the visual object group and one or more representations of the second subset of one or more visual objects, including generating a placeholder object group as a root node of the tree object and a representation of a visual object group as a child node of the placeholder object group, the first subset of the set of visual objects comprising child nodes of the visual object group and the second subset of the set of visual objects comprise one or more child nodes of the placeholder object group;
performing the pathfinding operations on the set of visual objects including traversing paths of the tree object by:
applying a first pathfinding operation to visual objects of the first visual object group to generate a first operation result; and
applying a second pathfinding operation to the first operation result and to the second subset of one or more visual objects to generate a second operation result; and
rendering an image based at least in part on the second operation result.

12. The method of claim 11, further comprising:
indicating a representation of the visual object group as a child node of the placeholder object group.

13. The method of claim 12, wherein the second subset of one or more visual objects comprise one or more child nodes of the placeholder object group.

14. The method of claim 11, wherein applying the first pathfinding operation to visual objects of the first visual object group comprises applying multiple pathfinding operations to the visual objects of the first object group to generate the first operation result.

15. The method of claim 11, wherein the tree object comprises an N-ary tree populated with the representations of the set of visual objects, and traversing the paths of the tree object comprises traversing paths of the N-ary tree according to depth first search traversal to generate the first operation result and the second operation result.

16. The method of claim 11, wherein the first pathfinding operation comprises an intersect operation and the second pathfinding operation comprises a union operation, and wherein performing the pathfinding operations on the set of visual objects comprises first applying the intersect operation to the first subset of visual objects to generate the first operation result, and then applying the union operation on the first operation result to generate the second operation result.

17. The method of claim 11, wherein the second pathfinding operation comprises one or more of a union operation, an exclude operation, or an intersect operation, and wherein the method further comprises:
 determining a visual object that has a highest z-order in the second operation result; and
 applying a color of the visual object to the second operation result.

18. The method of claim 11, wherein the second pathfinding operation comprises a subtraction operation, and wherein the method further comprises:
 determining a visual object that has a lowest z-order in the second operation result; and
 applying a color of the visual object to the second operation result.

19. A non-transitory computer-readable medium storing executable instructions, which when executed by a processing device, cause the processing device to perform operations comprising:
 receiving an indication of a set of visual objects and pathfinding operations to be performed on the set of visual objects;
 generating a tree object that includes representations of the set of visual objects, including generating a placeholder object group as a root node of the tree object and a representation of a visual object group as a child node of the placeholder object group, a first subset of the set of visual objects comprising child nodes of the visual object group and a second subset of the set of visual objects comprising one or more child nodes of the placeholder object group;
 performing the pathfinding operations on the set of visual objects including traversing paths of the tree object by:
  applying a first pathfinding operation to a first subset of the set of visual objects to generate a first operation result; and
  applying a second pathfinding operation to the first operation result and a second subset of the set of visual objects to generate a second operation result; and
 rendering an image using the second operation result.

20. The non-transitory computer-readable medium of claim 19, wherein the first subset of the set of visual objects comprises an object group of multiple visual objects, and wherein applying the first pathfinding operation to the first subset of the set of visual objects comprises applying multiple pathfinding operations to the multiple visual objects of the object group to generate the first operation result.

* * * * *